United States Patent
Engel et al.

(10) Patent No.: US 12,510,366 B2
(45) Date of Patent: Dec. 30, 2025

(54) METHOD AND SYSTEM FOR DETERMINING A STARTING POINT BETWEEN ENTITIES

(71) Applicant: MERCEDES-BENZ GROUP AG, Stuttgart (DE)

(72) Inventors: Michael Engel, Stuttgart (DE); Mark Gerban, Hamburg (DE); Benjamin Lange, Gärtringen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 101 days.

(21) Appl. No.: 18/285,676

(22) PCT Filed: Mar. 30, 2022

(86) PCT No.: PCT/EP2022/058436
§ 371 (c)(1),
(2) Date: Oct. 5, 2023

(87) PCT Pub. No.: WO2022/218709
PCT Pub. Date: Oct. 20, 2022

(65) Prior Publication Data
US 2024/0110798 A1  Apr. 4, 2024

(30) Foreign Application Priority Data

Apr. 13, 2021 (DE) .................... 10 2021 001 926.1

(51) Int. Cl.
*G01C 21/34* (2006.01)
(52) U.S. Cl.
CPC ..... *G01C 21/3438* (2013.01); *G01C 21/3461* (2013.01)
(58) Field of Classification Search
None
See application file for complete search history.

(56) References Cited

U.S. PATENT DOCUMENTS

| | | |
|---|---|---|
| 6,424,910 B1 | 7/2002 | Ohler et al. |
| 9,927,250 B2 | 3/2018 | Chen et al. |
| (Continued) | | |

FOREIGN PATENT DOCUMENTS

| | | | |
|---|---|---|---|
| DE | 102009052039 A1 | 7/2010 | |
| DE | 102009056641 A1 * | 6/2011 | ............. G06Q 10/04 |
| (Continued) | | | |

OTHER PUBLICATIONS

Machine translation of DE-102009056641-A1 (Year: 2011).*

(Continued)

*Primary Examiner* — Anne Marie Antonucci
*Assistant Examiner* — Kyle S Park
(74) *Attorney, Agent, or Firm* — PATENT PORTFOLIO BUILDERS PLLC

(57) ABSTRACT

A method is provided for determining a starting point between entities. The locations of the entities are determined in a map, a circle enclosing all entities is determined and an optimum position of the starting point is determined iteratively. The starting point initially coincides with a center point of the circle enclosing the entities. To find an optimum position of the starting point for each entity, a route is determined between the respective location and the starting point. In order to shift the position of the starting point, a sum of all of the temporal or physical distances of the routes between entities and the starting point falls below a defined maximum distance, and/or a temporal or physical distance difference between a shortest and a longest route falls below a specified maximum difference.

13 Claims, 2 Drawing Sheets

(56) References Cited

U.S. PATENT DOCUMENTS

| | | | |
|---|---|---|---|
| 10,575,127 B1* | 2/2020 | Ballot | H04W 4/029 |
| 2008/0215524 A1 | 9/2008 | Fuchs et al. | |
| 2010/0161210 A1 | 6/2010 | Watkins | |
| 2013/0080204 A1* | 3/2013 | Khorashadi | H04W 4/21 705/7.19 |
| 2017/0122756 A1 | 5/2017 | Chen et al. | |
| 2018/0149484 A1 | 5/2018 | Baer | |
| 2019/0020578 A1* | 1/2019 | Beckmann | H04L 45/02 |
| 2020/0019906 A1 | 1/2020 | Sugiyama et al. | |
| 2022/0065633 A1* | 3/2022 | Beaurepaire | G01C 21/343 |

FOREIGN PATENT DOCUMENTS

| | | |
|---|---|---|
| EP | 1729091 A1 | 12/2006 |
| EP | 3514061 A1 | 7/2019 |
| JP | 2002257580 A | 9/2002 |
| JP | 2005017199 A | 1/2005 |
| JP | 2008085945 A | 4/2008 |
| JP | 2009536372 A | 10/2009 |
| JP | 2011034200 A | 2/2011 |
| JP | 2013096923 A | 5/2013 |
| JP | 2020009320 A | 1/2020 |
| JP | 2020205122 A | 12/2020 |
| KR | 20100049859 A | 5/2010 |
| WO | 2016134315 A1 | 8/2016 |

OTHER PUBLICATIONS

Machine translation of JP 2008085945 A (Year: 2008).*

International Search Report and Written Opinion mailed Aug. 3, 2022 in related/corresponding International Application No. PCT/EP2022/058436.

Office Action created Dec. 23, 2021 in related/corresponding DE Application No. 10 2021 001 926.1.

Office Action dated Mar. 11, 2025 in related/corresponding JP Application No. 2023-562341.

Office Action dated Aug. 27, 2024 in related/corresponding JP Application No. 2023-562341.

Office Action dated Aug. 20, 2025 in related/corresponding KR Application No. 10-2023-7032806.

* cited by examiner

METHOD AND SYSTEM FOR DETERMINING A STARTING POINT BETWEEN ENTITIES

BACKGROUND AND SUMMARY OF THE INVENTION

Exemplary embodiments of the invention relate to a method for determining a starting point between entities and to a system for determining the starting point.

Entities, for example people, often want to meet in one place, for example to have a coffee or to go for a walk. Furthermore, the daily business of a delivery service is to deliver goods to different locations. To do this, the delivery service operates a means of transport that takes the goods from a starting point to different delivery locations.

The question arises as to where exactly the people should meet or where the starting point for delivery should be chosen so that the people have approximately the same distance to the meeting point or the delivery locations can be reached equally quickly starting from the starting point. This ensures the quickest possible arrival at the meeting point or delivery of the goods. Furthermore, the journey of the persons to a meeting point that is centrally located in terms of time and/or place between the locations of the persons is particularly fair, as no person has to travel much longer than another person.

In the following, entities can be understood as, for example: people, mobile devices, such as smartphones, laptops, tablet computers, wearables, or the like. A corresponding person or processing unit can also be assigned to a means of transport. Any road, rail, water, and air vehicles can be considered as means of transport. The processing unit can also be integrated into the means of transport.

A search method and apparatus for locating a rendezvous point is known from KR 1020100049859 A, wherein the rendezvous point corresponds to a midpoint between two entities meeting at the rendezvous point. To determine a suitable rendezvous point located approximately midway between the entities, points-of-interest (POIs) located in the vicinity of the midpoint are searched and examined for their suitability for the rendezvous. This involves determining a distance between the two entities in maps and halving this to determine the midpoint.

Exemplary embodiment of the present invention are directed to an improved method and system for determining such a starting point between a plurality of entities, with the aid of which a position of the starting point between the entities can be determined particularly fairly and accurately in different starting situations.

In a method for determining a starting point between entities, the entities are capable of determining their locations and each communicating by means of a communication interface. According to the invention, the locations of the entities are determined in maps, a circle enclosing all entities is determined, and an optimal position of the starting point is iteratively determined, wherein the starting point initially coincides with a center point of the circle enclosing the entities, wherein, in order to find an optimum position of the starting point for each entity, a route is determined between the respective location and the starting point, the route being composed of at least two route points connected by a route portion in each case, and, in order to shift the position of the starting point, a sum of all temporal or physical distances of the routes between entities and the starting point falls below a defined maximum distance, and/or a temporal or physical distance difference between a shortest and a longest route falls below a defined maximum difference.

With the help of the method according to the invention, the starting point between the entities can be determined particularly fairly. Thus, the entities cover the same distance to reach the starting point and/or need the same amount of time to do so. An influence of a means of transport used by a particular entity on a travel duration or distance is taken into account. For example, if a first entity travels by car and a second entity travels by bicycle, the distance to be travelled by the first entity may be longer than the distance to be travelled by the second entity because the car typically travels faster than the bicycle. In this case, the distance to be travelled by the car and the distance to be travelled by the bicycle can be covered by the respective means of transport in the same amount of time. The same duration or distance is understood here to be the same duration or distance minus or plus a defined tolerance range.

At least one entity can also lie on a circumference of the circle. Thus, a first approximation for an optimal position of the center point of the circle can be determined by creating the circle, in such a way that the two entities furthest away from each other lie on the circumference of the circle and a direct connecting line of these two entities runs through the center point of the circle.

If the starting point is placed between the locations of the entities in such a way that the sum of all temporal or physical distances of the respective routes chosen by the entities to the starting point is below the specified maximum distance, the time required for all entities to arrive at the starting point is reduced. The sum of the temporal or physical distances can also be minimized to the smallest possible value. With a shortest physical distance in sum, the entities consume the least fuel, emit the fewest pollutants, and may also reach their destination at a particularly low cost. According to a particular advantageous aspect, it would also be possible that if the starting point is positioned in such a way that the sum of the physical distances of the routes of the entities to the starting point is minimized, the sum of the temporal distances is also minimized at the same time.

If, on the other hand, the location of the starting point is chosen in such a way that the temporal or physical distance difference is less than the specified maximum difference, it is enabled for the entities to arrive at the starting point at the same time as far as possible. This is particularly fair, as each entity travels for approximately the same amount of time. It is also possible that the temporal or physical distance difference between the routes travelled by the entities to the starting point is minimized. It is also possible that both the sum of the temporal or physical distance is less than the specified maximum distance and the temporal or physical distance difference is less than the specified maximum difference.

However, there may also be the possibility that the starting point between the entities cannot be placed such that at least one of the criteria, i.e., the falling below of the specified maximum distance by the sum of the temporal or physical distance or the falling below of the specified maximum difference by the temporal or physical distance difference, can be met. In this case, the determination of the starting point is terminated. For example, an alternative starting point for the entities can then be proposed, which is placed at any position between the entities.

Analogously to the prior art, points-of-interest (POIs) located in a vicinity of a route can be taken into account to determine the position of the starting point. For example, the starting point can also be moved closer towards one of the entities if there is a destination of interest to the entities there, such as a café, library, park, or the like.

In order to determine the location of an entity, it can have any location determination device, for example a receiver of a global navigation satellite system. Via the communication interface, the entity can also transmit further information in addition to its location. Communication between the entities can take place directly, or indirectly via a third processing unit, for example a central, possibly fixed processing unit. The communication technology can be any proven communication technology. For example, communication can take place wirelessly, in particular by means of mobile radio, WiFi, Bluetooth, NFC, or the like.

The calculation of the route and the finding of the starting point within the circle comprising the entities is carried out optionally on the central processing unit and/or on at least one of the entities. For this purpose, the entities transmit their respective location to the central processing unit and/or the other entities via the communication interface.

If the determined starting point is within a pre-defined tolerance range, it may be necessary for the entities to agree to the determined position of the starting point and a breadth of the tolerance range before they start their journey to the starting point. This ensures that the starting point is not unfairly moved too close to one of the entities. The tolerance range can be used to compensate for an entity arriving at the starting point at a later time than an agreed time, for example due to a delay caused by congestion and/or a schedule deviation. For example, the tolerance range takes the form of a further circle, the center point of which is at the starting point, wherein the further circle has a smaller diameter than the circle encompassing the entities.

An advantageous development of the method is that the entities meet at the starting point from their respective locations. As already mentioned, the starting point can be, for example, a café, a library, a park, or the like, from which the entities start a common activity. In this example, the starting point could also be interpreted as a meeting point or rendezvous point.

According to a further advantageous embodiment of the method, delivery entities move from the starting point along the routes extending from the locations of the entities to the starting point to the location of the respective entities. Thus, the method according to the invention can also be used to optimize a distance to be covered by a means of transport of a delivery service to reach a customer or a time required for this. For example, a delivery service can send a distribution vehicle to the starting point, the distribution vehicle comprising drones, in particular autonomously controlled drones, which then fan out along the respective route to the location of the corresponding entities. Since this preferably requires the same amount of time to cover the routes, it is enabled particularly reliably for the drones to arrive at the distribution vehicle again at the same time after handing over goods to be delivered to the customers. This can improve the efficiency of distributing goods for the delivery service. It is also possible that persons travel with the distribution vehicle, who then travel from the starting point, for example with the same or a different means of transport, to the location of the respective entities. The delivery service can be, for example, a parcel delivery service, a food delivery service, or the like. In addition to POIs such as an optimal parking position for the distribution vehicle, further map information can also be read from the maps, for example a no-fly zone for unmanned drones.

A further advantageous embodiment of the method further provides that the locations of the entities are determined in maps provided by at least two map providers, wherein the locations of an entity determined in the different maps are compared with each other. By using maps provided by different map providers, the location of a particular entity and ultimately also a position of the starting point within the circle enclosing the entities can be determined even more precisely. By comparing map data from different providers, position deviations or an inaccurately determined position of an entity can be determined and corrected. The maps of the different map providers can also comprise different POIs and/or map information. This increases the amount of information used to carry out the method according to the invention. As a result, the method can be used even more reliably.

According to a further advantageous embodiment of the method, current traffic information is taken into account when calculating the routes between the locations of the entities and the starting point. For example, if an entity travels by car, there may be a traffic jam on the route travelled by that entity. This will increase the time required to travel the route. If, for example, the other entity travels by public transport such as an underground train, tram, commuter train, city bus or the like, delays may also occur. Information about possible traffic jams and/or timetable changes can be obtained from proven third-party sources. These delays are advantageously taken into account when determining the starting position. If, for example, the time required to cover a route is extended by such a delay, the starting point is shifted in such a way that the entities still arrive at the starting point at the same time, plus or minus the defined tolerance threshold, or delivery entities swarming from the starting point arrive at the same time at the location of the entities, i.e., the customers. This ensures that the position of the starting point is determined particularly fairly and accurately, even in realistic traffic situations.

A further advantageous embodiment of the method further provides that at least one entity moves along its route by one of the following means of transport:
  on foot;
  on a bicycle;
  on an e-scooter;
  by means of public transport, in particular by bus and/or train;
  in a car, in particular a passenger car, truck and/or van;
  on an aircraft; or
  by an autonomously controllable vehicle, in particular a drone, preferably a flying drone.

In general, it is also conceivable that the entity changes the means of transport during its journey along the route. For example, the entity can travel on foot during a first portion of the route, then switch to a bicycle, and cover a final portion of the route by bus, for example. The entity may also use an e-scooter, for example. This enables the method according to the invention to be used in even more extensive and different travel situations.

If, for example, an entity travels by train, stops located within a radius of the location of the respective entity are determined in maps and connections from the respective stops, including potential transfer options to the respective stop in the vicinity of the starting point, are determined and examined with regard to their travel time. To determine the total travel time for an entity, the distance and/or time that the respective entity has to cover to the stop, for example on foot, is also taken into account. A stop or a point near a stop can also be determined as the starting point. It is also conceivable that different entities travel by different means of transport, for example some entities travel by train and an e-scooter, some entities travel by car and on foot, and some entities travel exclusively by bicycle.

Preferably, average travel speeds for the respective entities are assumed in order to determine the optimal position of the starting point. The travel speeds of the respective entities can also be learned depending on a means of transport chosen by them. Thus, the travel behavior of a particular entity can be observed over time, resulting in travel speeds that are dependent on time and/or distance. For example, if an entity travels a certain distance at a certain time on an underground, this may require a longer period of time during rush hour due to a large number of people getting on and off. If another entity travels, for example, by bicycle, this entity may need a shorter or longer period of time to travel a certain portion of the route, for example, if this entity has to travel uphill or downhill, or, for example, travels more slowly after lunch due to a full stomach.

According to a further advantageous embodiment of the method, an algorithm for determining the position of the starting point within the circle comprising the entities performs at least the following steps:
  determining a suitable position of a center point of a circle and a minimum circle diameter so that all entities lie within or on a circumference of the circle;
  placing the position of the starting point at the position of the center point of the circle;
  for each entity: determining a route extending from the location to the starting point;
  shifting the position of the starting point so that a sum of all temporal or physical distances of the routes between entities and the starting point falls below a specified maximum distance, and/or a temporal or physical distance difference between a shortest and a longest route falls below a specified maximum difference.

Placing the starting point at the center point of the circle is a first approximation for finding the optimal position of the starting point between the entities so that the entities can arrive at the starting point as quickly and/or fairly as possible, at the same time. A determination of the circle is easily and quickly possible. According to an exemplary embodiment, the two entities with the greatest distance to each other are selected from all entities and the circle is stretched so that these entities lie on the circumference of the circle. The center point of the circle then lies on a direct connecting line between these entities. The starting point is then moved from the center point of the circle until the sum of all temporal or physical distances of the routes between entities and the starting point falls below a specified maximum distance, and/or a temporal or physical distance difference between a shortest and a longest route falls below a specified maximum difference. Other approaches for spanning the circle enclosing the entities are conceivable.

A further advantageous embodiment of the method further provides that the starting point is recalculated taking into account a current location of at least one entity. If, for example, delays occur during the journey along the route for at least one entity, this would result in the entities not arriving at the starting point at the same time. Similarly, in the example of the delivery service, the goods would not arrive at the entities, i.e., customers, at the same time and/or drones delivering the goods would not return to the distribution vehicle at the same time. However, by monitoring the current position of the respective entity during the journey along the routes, the position of the starting point can be adaptively shifted within the circle comprising the entities. This can ensure simultaneous arrival of the entities at the starting point or arrival of the goods at the original locations of the entities. Also, when the drones return to the distribution vehicle, the distribution vehicle can move towards a drone if that drone takes longer than expected to return.

Preferably, at least one of the following criteria is additionally taken into account to determine the position of the starting point within the circle:
  a fairness;
  a quantity of pollutant produced by moving at least one means of transport along a route, in particular a $CO_2$ quantity;
  an amount of energy required by at least one means of transport to move along a route; and/or
  costs incurred to move at least one means of transport along a route.

By considering at least one of the mentioned criteria, a shift of the starting point within the circle comprising the entities can be adjusted according to customer preferences. For example, according to a first scenario, the starting point can be positioned within the circle in such a way that the entities reach the starting point after the shortest possible time. For example, one entity travels to the starting point by car, but another entity has to change the means of transport several times to reach the starting point. This is associated with a high effort for the other entity. Taking fairness into account, the starting point can be shifted within the circle in such a way that a longer period of time is necessary for all entities to reach the starting point, but the entities have to overcome a similar effort to reach the starting point. For example, the starting point can then be set at a public transport stop, whereupon a large number of entities travel to the starting point by public transport. For this, the respective entities then have to change trains the same number of times.

Acceptance for carrying out the method according to the invention can be increased by taking into account a quantity of pollutants produced by environmentally conscious persons.

Accordingly, an amount of energy required to travel along the routes and/or costs incurred to position the starting point within the circle can also be taken into account.

In particular, a customer is able to decide for themself which or which of the mentioned criteria should be additionally taken into account for determining the position of the starting point. This ensures a particularly high level of comfort and satisfaction when using the method according to the invention.

In a system for determining a starting point between entities comprising at least three entities, the entities each being configured to determine their location and to share it via a communication interface, according to the invention at least the three entities are configured to perform a method described above.

The entities are, for example, persons or processing units, for example in the form of a mobile device such as a smartphone, tablet computer, laptop, wearable, or the like. The persons and/or processing entities may travel by a mode of transport such as a car, truck, van, bus, train, bicycle, on foot, or the like. It is also possible to change the means of transport during a journey of an entity. Also, at least one entity may be integrated into a corresponding means of transport. For example, an entity may be formed by a processing unit of a vehicle.

The entities can also communicate indirectly via a central processing unit. The central processing unit can also determine the starting point for the entities. For this purpose, the central processing unit receives the locations of the entities and, using a method according to the invention, determines the starting point for meeting or for swarming drones.

Further advantageous embodiments of the method according to the invention for determining the starting point between the entities can also be found in the exemplary embodiments, which are described in greater detail below with reference to the figures.

BRIEF DESCRIPTION OF THE DRAWING FIGURES

DETAILED DESCRIPTION

Figure 1:
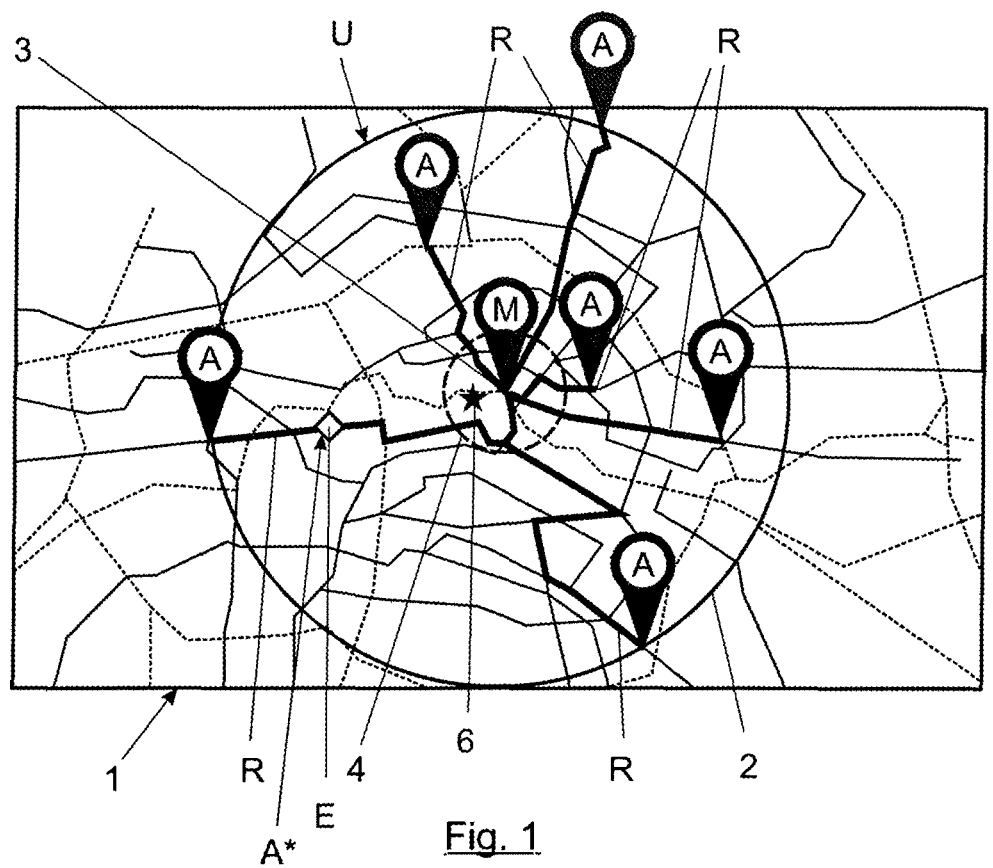
FIG. 1 shows a schematic depiction of entities that have arranged to meet at a starting point on a digital road map.

FIG. 1 shows maps 1, here in the form of a digital road map. In the example in FIG. 1, the digital road map comprises a detail of a conurbation, for example a large city. In the city, there are several entities E at respective locations A. Only one entity E is shown, which is at a current location A* on a journey along a route R. The entities E have arranged to meet. With the aid of a method according to the invention, a starting point M is determined, at which the entities E can arrive in an equal time and/or by covering an equal distance. In doing so, an entity E travels along a route R determined for it to the starting point M. This ensures that a duration until all entities E participating in the meeting arrive at the starting point M is minimized and/or their journey is particularly fair, since each entity E has to travel the same amount of time.

Entities E are, for example, persons or processing units, for example in the form of a mobile terminal such as a smartphone, tablet computer, laptop, wearable, or the like. Such a processing unit can also be integrated into a vehicle. For example, the processing unit can then be a central on-board computer of a vehicle, a control unit of a vehicle subsystem, a telematics unit, or the like.

The entities E each move through the city using a means of transport. For example, the entities E are travelling on foot, by bicycle, by e-scooter, by public transport, by a privately operated vehicle such as a car, truck, van, or the like, and/or by an autonomously operated vehicle such as a drone. In this context, a single or multiple change of means of transport is also possible during a journey from an original location A to the starting point M. For example, an entity E in the form of a person can travel from their place of residence with an e-scooter to a stop of a local public transport system and then travel with, for example, a bus to a stop located in the vicinity of the starting point M, and from there reach the starting point M on foot from the stop.

According to the invention, a position of the starting point M in the maps 1 is determined in such a way that a sum of all temporal or physical distances of the routes R between an original location A of the entities E and the starting point M falls below a specified maximum distance, and/or a temporal or physical distance difference between a shortest and a longest route R falls below a specified maximum difference.

To determine a location of the starting point M, a different travel speed depending on a selected means of transport is taken into account.

In order to determine the starting point M, the entities E determine their respective location A, then the entities E transmit their position at least to a processing unit determining the location of the starting point M. This processing unit can be formed by at least one of the entities E and/or a central processing unit 8 shown in FIG. 3. The corresponding processing unit determines a circle 2 comprising all entities E involved in the meeting. For example, the circle 2 can be determined by determining the two entities E furthest away from each other and placing the circle 2 in such a way that these entities E are placed on a circumference U of the circle 2. In doing so, a direct connecting line of these two entities E may pass through a center point 3 of the circle 2. Preferably, the circle 2 has the smallest possible diameter. In a first approximation, the starting point M is placed at the circle center point 3 and iteratively moved within the circle 2 until the sum of all temporal or physical distances of the routes R between entities E and starting point M falls below the specified maximum distance, and/or the temporal or physical distance difference between a shortest and a longest route R falls below the specified maximum difference.

In doing so, the entities E can record their current location A*. According to one embodiment of the method according to the invention, the respective current location A* can be used for the adaptive displacement of the starting point M. For example, if one of the entities E is in a traffic jam, the starting point M can be shifted closer to this entity E. This ensures that the entities E arrive at the starting point M at the same time, as planned, despite a delay in time of at least one entity E.

It is also possible that one or more POIs 6 are located close to the starting point M and the starting point M is placed on one of these POIs 6 or in the vicinity thereof. For example, the POI 6 may be a café, library, park, or the like. In other words, the entities E plan to meet at one of the POIs 6.

In order to improve the accuracy with which the respective locations A, A* are determined, maps 1 provided by various map providers can be used in accordance with one embodiment of the method according to the invention.

FIG. 1 also shows a circular tolerance region 4. The criteria defined in the previous section for the arrival of entities E at the starting point M are considered to be fulfilled if the entities are located within the tolerance region 4 at a defined point in time. A radius of the tolerance region 4 can, for example, be only a few meters or also several hundred meters or even kilometers. Advantageously, the entities E participating in the meeting determine how large the radius of the tolerance region 4 is selected before the start of their respective route R. This ensures that the journey to the starting point M is considered fair for each entity E.

For a more precise determination of a path length and/or time required to cover a route R, at least one route R can also be divided into several route portions. In this case, each route portion is associated with information such as a route length, an applicable speed limit, lines using the route portion, for example underground railway lines, a time required to cover the route portion or the like. A route portion can be iteratively divided into further sub-route portions to increase accuracy.

Figure 3:
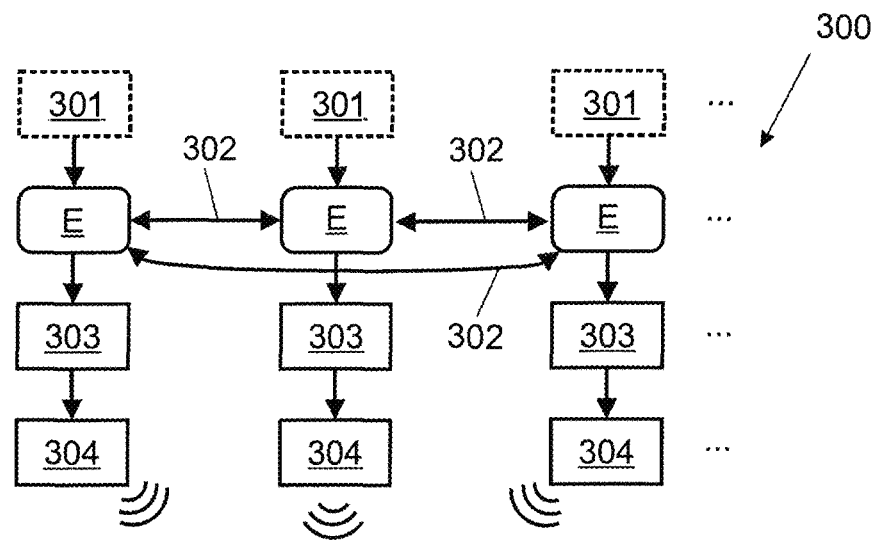
FIG. 3 shows a principle depiction of a flow chart of a method according to the invention for determining the starting point between entities.
Figure 3:
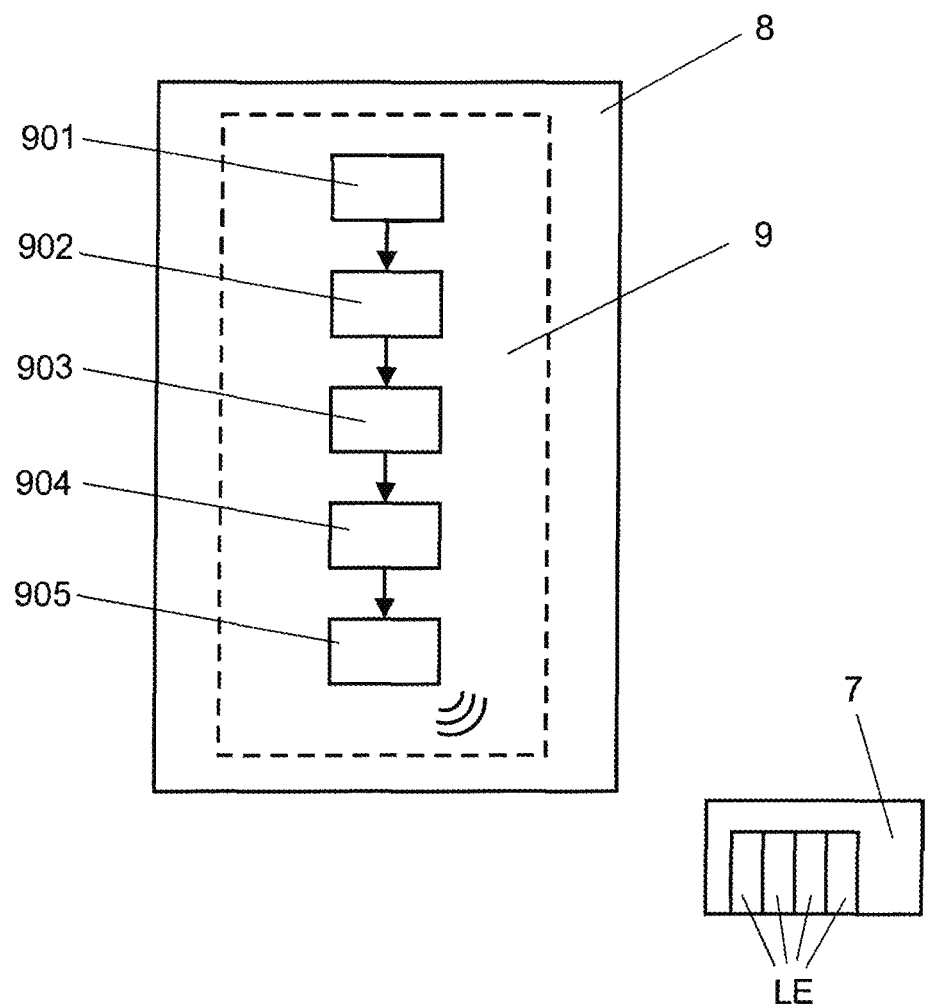

According to one embodiment of the method according to the invention, it is also possible that a distribution vehicle 7, which is shown in FIG. 3, travels to the starting point M, and delivery entities LE, for example drones, fan out from the distribution vehicle 7 to the locations A or also A* of the entities E. For example, the drones may deliver goods to the entities E. The goods may be, for example, parcels or food.

Figure 2:
FIG. 2 shows a further schematic depiction of entities that have arranged to meet at a starting point on a digital road map.

FIG. 2 illustrates that the method according to the invention is not limited to certain distances. The method according to the invention can also be used to determine a starting point M for several entities E which are located at opposite ends of a country 5.

FIG. 3 shows a flow chart 300 of the method according to the invention. In an optional method step 301, the entities E can determine whether additional criteria are to be taken into account for determining the starting point M. The additional criteria are, for example, fairness, an amount of pollutants, in particular in the form of $CO_2$, generated by a movement of at least one means of transport along a route R, an amount of energy required by at least one means of transport to move along a route R and/or costs incurred for this purpose.

In a method step 302, the entities E arrange to meet at the starting point M. In a method step 303, the respective entities E determine their original location A and transmit this in method step 304. In the example in FIG. 3, the respective location A is transmitted to a central processing unit 8, for example a cloud server or a backend of a service provider. The starting point M is then determined by the central processing unit 8. For this purpose, an algorithm 9 is executed on the central processing unit 8. The algorithm 9 comprises five steps 901, 902, 903, 904 and 905.

In step 901, a circle 2 enclosing the entities E and its position in the maps 1 are determined. In step 902, the starting point M is placed as a first approximation at the center point 3 of the circle 2. In step 903, a route R is determined for each entity E from its original location A to the starting point M. In step 904, the position of the starting point M is then shifted within the circle 2 until the sum of all temporal or physical distances of the routes R between entities E and starting point M falls below the specified maximum distance, and/or a temporal or physical distance difference between a shortest and a longest route R falls below a specified maximum difference. New routes R of the entities E are calculated accordingly. Thus, finally, in step 905, an optimal location of the starting point M within the circle 2 is found. This location is then transmitted back to the entities E so that they can start their journey to the starting point M.

It is also possible that a location of the starting point M and/or other related information is transmitted to a distribution vehicle 7. The distribution vehicle 7 comprises delivery entities LE. These can be, for example, individual persons or autonomous drones, for example drones capable of flying, which deliver goods, food or the like to the entities E. If the distribution vehicle 7 is at the starting point M when the delivery entities LE fan out from the distribution vehicle 7, the delivery entities LE can reach the entities E simultaneously and preferably also arrive back at the distribution vehicle 7 simultaneously. This allows a delivery service to distribute goods to customers particularly effectively and efficiently. The radius or diameter of the circle 2 can also be determined taking into account a possible range of the delivery entities LE in order to ensure that, for example, an energy supply of a drone is not exhausted before the drone has arrived at an entity E to be supplied by it or back at the distribution vehicle 7.

In general, it is also possible for the entities E to transmit their location A to each other and to dispense with data transmission to the central processing unit 8. For example, the algorithm 9 can also be executed on one or all entities E. Accordingly, one of the entities E transmits back to the other entities E the starting point M determined by it.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method comprising:
learning, over a first period of time, travel behavior of a first entity;
learning, over a second period of time, travel behavior of a second entity, wherein the travel behavior of the first and second entities includes means of transport dependent travel speeds;
determining locations of the first and second entities in at least one map;
determining a circle enclosing the first and second entities;
determining a means of transport selected by the first and second entities; and
iteratively determining an optimum position of a meeting point, based on an assumed average travel speed of the first entity based on the means of transport selected by the first entity and on an assumed average travel speed of the second entity based on the means of transport selected by the second entity, and by
initially setting a meeting point as a center point of the circle enclosing the first and second entities, and
determining the optimum position of the meeting point for each of the first and second entities by
determining a first route between the determined location of the first entity and the meeting point and determining a second route between the determined location of the second entity and the meeting point, wherein the determined first and second routes are each composed of at least two route points connected by a route portion, and
shifting a position of the meeting point from the initially set meeting point to the optimum position, wherein the determined optimum position is a position in which
a sum of all of temporal or physical distances of the determined first and second routes and the meeting point falls below a defined maximum distance, or
a temporal or physical distance difference between a shortest and a longest route determined for the first and second entities falls below a specified maximum difference,
wherein one of the first and second entities selected an autonomous vehicle as the means of transport and the autonomous vehicle autonomously drives the one of the first and second entities to the meeting point along the first or second route.

2. The method of claim 1, wherein the at least one map comprises maps provided by at least two map providers, wherein a location of either of the first and second entities is determined in each of the maps provided by the at least two map providers and the locations in the maps are compared with each other.

3. The method of claim 1, wherein the determination of the first and second routes accounts for current traffic information.

4. The method of claim 1, wherein the other one of the first and second entities moves along its respective route by one of the following modes of transport:
- on foot;
- on a bicycle;
- on an e-scooter;
- by public transport;
- in a car, truck, or van; or
- by a flying drone.

5. The method of claim 1, wherein the determination of the circle comprises determining a position of the center point of the circle and a minimum circle diameter of the circle so that the first and second entities lie within or on a circumference of the circle.

6. The method of claim 1, further comprising:
determining an updated current location of either of the first and second entities, wherein the meeting point is recalculated based on the updated current location of either of the first and second entities.

7. The method of claim 1, further comprising:
receiving, from the one of the first and second entities, a selection of one of the following options
a quantity of pollutant produced by moving at least one means of transport along a route to the meeting point, or
an amount of energy required by at least one means of transport to move along the route to the meeting point,
wherein the determination of the optimum position of the meeting point accounts for the option selected by the one of the first and second entities.

8. A method comprising:
learning, over a first period of time, travel behavior of a first entity, wherein the travel behavior of the first entity includes means of transport dependent travel speeds;
determining locations of the first entity and of a second entity in at least one map;
determining a circle enclosing the first and second entities;
determining a means of transport selected by the first and second entities;
receiving, from the first entity, a selection of one of the following options a quantity of pollutant produced by moving at least one means of transport along a route or an amount of energy required by at least one means of transport to move along a route; and
iteratively determining an optimum position of a meeting point, based on an assumed average travel speed of the first entity based on the means of transport selected by the first entity, as well as based on the received selection from the first entity, and by
initially setting a meeting point as a center point of the circle enclosing the first and second entities, and
determining the optimum position of the meeting point for each of the first and second entities by
determining a first route between the determined location of the first entity and the meeting point and determining a second route between the determined location of the second entity and the meeting point, wherein the determined first and second routes are each composed of at least two route points connected by a route portion, and
shifting a position of the meeting point from the initially set meeting point to the optimum position, wherein the determined optimum position is a position in which
a sum of all of temporal or physical distances of the determined first and second routes and the meeting point falls below a defined maximum distance, or
a temporal or physical distance difference between a shortest and a longest route determined for the first and second entities falls below a specified maximum difference,
wherein the first entity selected an autonomous vehicle as the means of transport and the autonomous vehicle autonomously drives the first entity to the meeting point along the first route.

9. The method of claim 8, wherein the at least one map comprises maps provided by at least two map providers, wherein a location of either of the first and second entities is determined in each of the maps provided by the at least two map providers and the locations in the maps are compared with each other.

10. The method of claim 8, wherein the determination of the route accounts for current traffic information.

11. The method of claim 8, wherein the second entity moves along its respective route by one of the following modes of transport:
- on foot;
- on a bicycle;
- on an e-scooter;
- by public transport;
- in a car, truck, or van; or
- by a flying drone.

12. The method of claim 8, wherein the determination of the circle comprises determining a position of the center point of the circle and a minimum circle diameter of the circle so that the first and second entities lie within or on a circumference of the circle.

13. The method of claim 8, further comprising:
determining an updated current location of at least one of the first and second entities, wherein the meeting point is recalculated based on the updated current location of the at least one of the first and second entities.

* * * * *